United States Patent

Duneau

[11] Patent Number: 5,166,672
[45] Date of Patent: Nov. 24, 1992

[54] AUTOMOBILE REAR LIGHT MULTIPLE FUNCTION DISPLAY WITH A PLURALITY OF MINIATURE LAMPS

[75] Inventor: André Duneau, Evreux, France

[73] Assignee: Valeo Vision, Bobigny Cedex, France

[21] Appl. No.: 337,401

[22] Filed: Apr. 13, 1989

[30] Foreign Application Priority Data

Apr. 28, 1988 [FR] France .................. 88 05674

[51] Int. Cl.[5] ............................... G08B 5/24
[52] U.S. Cl. ................. 340/815.17; 340/479
[58] Field of Search ............ 340/815.14, 815.15, 340/815.16, 815.17, 815.18, 815.19, 815.2, 815.01, 815.02, 332, 461, 458, 468, 475, 479; 307/108; 362/29, 80; 315/77, 64

[56] References Cited

U.S. PATENT DOCUMENTS

| | | | |
|---|---|---|---|
| 2,957,161 | 10/1960 | Daws | 340/475 |
| 3,487,206 | 12/1969 | Dawson et al. | |
| 3,535,680 | 6/1970 | Onksen et al. | 340-475 |
| 3,603,840 | 9/1971 | Du Rocher | 340/475 |
| 3,798,460 | 3/1974 | Takeda et al. | 362/80 |
| 4,029,991 | 6/1977 | Schultz | 315/77 |
| 4,177,497 | 12/1979 | McCook et al. | 362/29 |
| 4,236,480 | 12/1980 | Cröhl | 362/29 |
| 4,255,739 | 5/1981 | Lang | 340/815.15 |
| 4,587,457 | 5/1986 | Lind | 315/64 |
| 4,684,819 | 8/1987 | Haag et al. | 340/458 |
| 4,812,814 | 5/1989 | Elliott | 340/401 |
| 4,857,890 | 8/1989 | Solow | 340/479 |
| 4,878,387 | 11/1989 | Muramatsu | 340/815.15 |
| 4,952,909 | 8/1990 | Woerner | 340/479 |

FOREIGN PATENT DOCUMENTS 1332650 6/1962 France .
1363551 6/1963 France .

Primary Examiner—Ulysses Weldon
Assistant Examiner—Xiao Min Wu
Attorney, Agent, or Firm—Wenderoth, Lind & Ponack

[57] ABSTRACT

The invention relates to a multiple indicator display having a plurality of miniature lamps, for a rear light of an automotive vehicle. The display uses a plurality of miniature lamps for each of various functions, and comprises at least one attenuating device for the light flux of at least certain of the lamps forming part of the display itself and supplied through a separate input of the supply circuit for the lamps.

20 Claims, 2 Drawing Sheets

AUTOMOBILE REAR LIGHT MULTIPLE FUNCTION DISPLAY WITH A PLURALITY OF MINIATURE LAMPS

FIELD OF THE INVENTION

This invention relates to an indicator display for a rear light of an automotive vehicle, using a plurality of miniature lamps for each function.

BACKGROUND OF THE INVENTION

Commonly, indicator displays for automotive vehicles comprise a number of compartments each of which is associated with one particular function, for example position, braking, fog lamp operation, direction indication, etc. Each compartment contains an electric light bulb or indicator lamp, with an electrical circuit associated with the display controlling the selection of the power supply to the indicator lamps.

When regulations permit, one common compartment may be used for indicating two functions, for example position and braking, or position and fog light operation. A single lamp of the double filament kind is used to ensure, for each function, the required luminous intensity for the corresponding function.

These conventional indicator displays have a number of disadvantages. The most significant of these is the substantial depth (from front to back) of the display itself, which is necessitated by the deep recesses which have to be provided in the bodywork. This depth leads to a considerable loss of useful space, in particular in the instrument panel. In addition, these displays, having one single lamp for each function, call for optical means for distributing the emitted light, the source of which is a point source. It is difficult to avoid, in the lighting arrangement, the phenomenon whereby one point appears brighter than others and which may indeed dazzle.

To overcome these disadvantages it has been proposed to use for each function a plurality of miniature lamps. These miniature lamps, which only have a single filament, do not allow several functions to be displayed.

In French published patent application No. 1 363 551, it has been proposed, for a conventional display having one lamp per function, to shunt as required a resistor in the supply circuit for a lamp, in order to ensure, for that particular function, a luminous intensity which can be made different according to local regulations or conditions of use, for example whether it is day or night. This known indicator display has the same disadvantages as the conventional displays, and also requires complicated connections.

SUMMARY OF THE INVENTION

An object of the present invention is to provide a novel indicator display having a plurality of miniature lamps of the single filament kind for each function, and which allows at least certain of the lamps to be used for more than one function while being capable of being connected electrically in a conventional manner.

To this end, the indicator display according to the invention further comprises at least one attenuating means for the attenuation of the light flux of at least certain of the lamps forming part of the display. The attenuating means is supplied through a separate input of the electrical supply circuit for the lamps.

In this way, the indicator display according to the invention can, without calling for any modification of the electric supply wiring harness, be substituted for a conventional display in which certain lamps have two filaments supplied through one or the other of two different inputs or control circuits.

The attenuating display may for example comprise at least one resistor connected in series in the supply circuit for the lamps of one of the compartments and disposed in a zone of the display which does not contain an electric light bulb, for example, behind the reflective screen. This last embodiment of the invention avoids the need for any additional space to be provided for the display.

The attenuating means may also comprise an electronic voltage divider or an electronic chopper.

The invention will be better understood upon reading the following description, which is given by way of example only and with reference to the accompanying drawings.

DESCRIPTION OF PREFERRED EMBODIMENT

Figure 1:
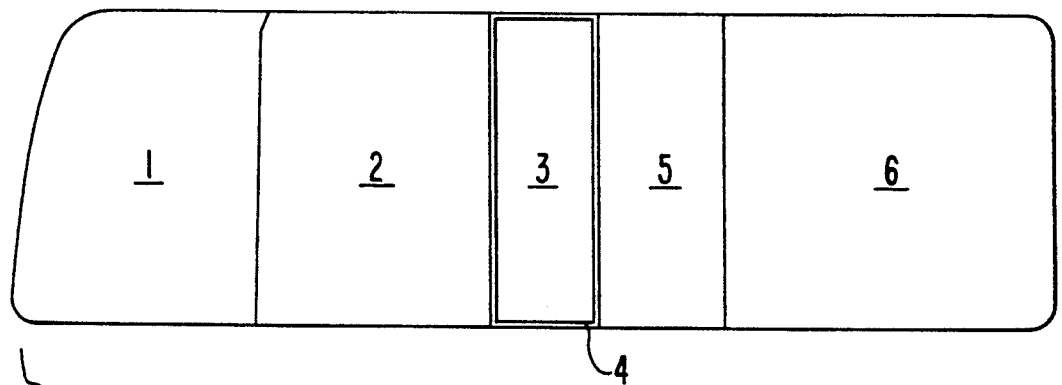
FIG. 1 is a diagrammatic plan view of an indicator display in one embodiment of the invention.
Figure 2:
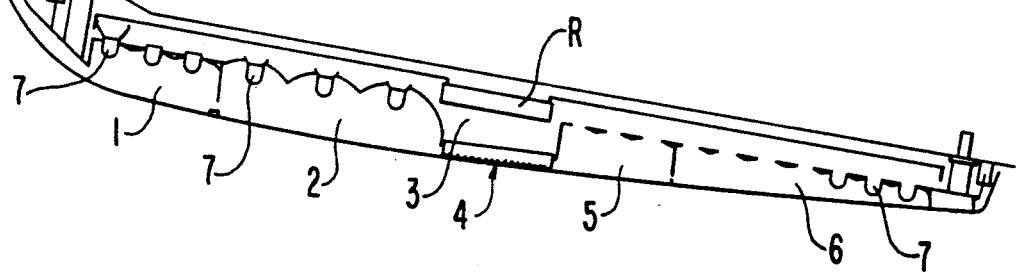
FIG. 2 is a view in longitudinal cross section of the display shown in FIG. 1.

The indicator display according to the invention comprises a first compartment 1 corresponding to the direction indicating function, a second compartment 2 for the indication of the braking function, a third compartment 3 (without any light bulbs), which is closed by a reflective screen 4, a fourth compartment 5 for the reversing function, and a fifth compartment 6 for fog lamp and lighting functions. In a variant, and as depicted in FIG. 4, the compartment 2 may be arranged for the lighting function and to indicate the braking (or "stop") function, with the compartment 6 then being dedicated only to the fog lamp function.

Each of the compartments 1, 2, 5 and 6 includes a plurality of miniature lamps 7. The lamps 7 are connected in series for each compartment with a common ground M and with a control or input line C.

Figure 4:
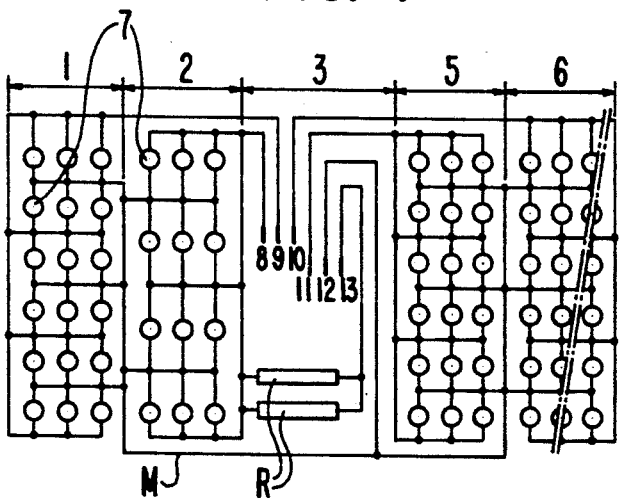
FIG. 4 is a variant of an electrical circuit diagram for the display shown in FIGS. 1 and 2.

In addition, as shown in FIG. 4, the lamps 7 of the compartment 2 (or the lamps 7 of the compartment 6 in the above mentioned variant) are connected to a second control input C' corresponding to the lighting function, through a resistor R which is mounted facing towards the reflective screen 4.

As can be seen from the electrical circuit diagram of FIG. 4, the indicator display includes, in conventional manner, a "stop" input 8 connected to the lamps 7 of the compartment 2, a flasher input 9 connected to the lamps 7 of the compartment 1, a fog lamp input 10 connected to the lamps 7 of the compartment 6, a reversing light input 11 connected to the lamps 7 of the compartment 5, a ground input 12 which is common to all of the lamps 7, and a lighting input 13 which is connected to the lamps 7 of the compartment 2 through two resistors R in parallel. In the above mentioned variant, the resistors R would be in the supply circuit for the lamps 7 of the compartment 6.

The connections 8 to 13, which may take the form of a multiple connector with parallel terminals in a printed or cut out circuit, is fully integrated in the display, with branches or interconnections being provided directly in a conventional manner.

Figure 3A:
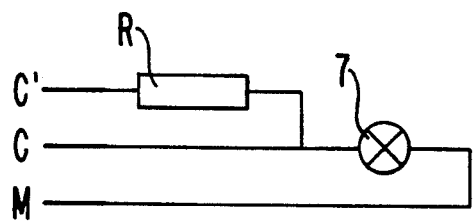
FIGS. 3A, 3B and 3C are electrical circuit diagrams for alternative partial electrical supplies.
Figure 3B:
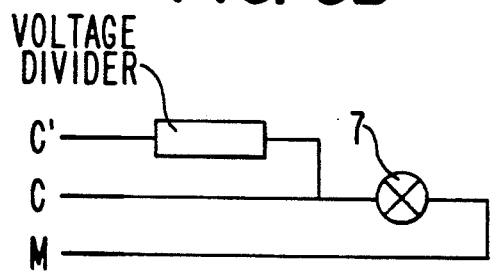
Figure 3C:
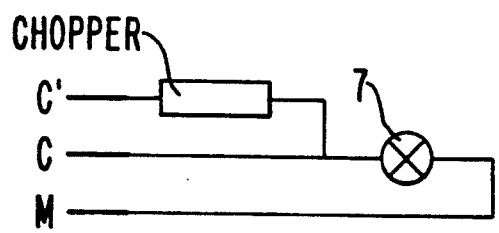

The display according to the invention, in particular when the attenuation device is electronic (for example an electronic voltage divider or electronic chopper, as shown in FIGS. 3A and 3B respectively), is particularly suitable for use with an electronic control system using multiplexing.

It can be mounted in place of a display of the kind comprising multi-filament lamps, without modification of the electric wiring harness of the vehicle.

What is claimed is:

1. An automobile rear light assembly comprising:
    a plurality of compartments;
    a first plurality of miniature lamps mounted in a first of said plurality of compartments to define a first function display adapted to display a first automobile function;
    a first input means for causing lighting of said first plurality of miniature lamps upon occurrence of said first automobile function;
    a second plurality of miniature lamps mounted in a second of said plurality of compartments to define a dual function display adapted to display second and third automobile functions;
    a dual input means, comprising two inputs, for lighting said second plurality of miniature lamps upon either of said second and third automobile functions occurring independently of one another, one of said two inputs of said dual input means being provided with an attenuating means for attenuating the lighting of said second plurality of miniature lamps upon occurrence of said second automobile function; and
    wherein a third of said plurality of compartments has no miniature lamps mounted therein and includes a reflective screen, and said attenuating means is mounted in said third compartment behind said reflective screen.

2. An assembly as recited in claim 1, further comprising
    a third plurality of miniature lamps mounted in a fourth of said plurality of compartments to define a third function display adapted to display a fourth automobile function; and
    a third input means for causing lighting of said third plurality of miniature lamps upon occurrence of said fourth automobile function.

3. An assembly as recited in claim 2, further comprising
    a fourth plurality of miniature lamps mounted in a fifth of said plurality of compartments to define a fourth function display adapted to display a fifth automobile function; and
    a fourth input means for causing lighting of said fourth plurality of miniature lamps upon occurrence of said fifth automobile function.

4. An assembly as recited in claim 1, wherein
    said attenuating means comprises at least one resistor connected in series with said second plurality of miniature lamps of said dual function display.

5. An assembly as recited in claim 4, wherein
    said at least one resistor comprises two parallel resistors.

6. An assembly as recited in claim 1, wherein
    said attenuating means comprises an electronic voltage divider connected in series with said second plurality of miniature lamps of said dual function display.

7. An assembly as recited in claim 1, wherein
    said attenuating means comprises an electronic chopper connected in series with said second plurality of miniature lamps of said dual function display.

8. An assembly as recited in claim 1, wherein
    said first, second and third automobile functions are chosen from among directional indication, braking indication, automobile reversal indication, fog lamp lighting, and rear lighting.

9. An assembly as recited in claim 8, wherein
    said second and third automobile functions assigned to said dual function display are said rear lighting and said braking indication.

10. An assembly as recited in claim 1, wherein
    said second and third automobile functions assigned to said dual function display are rear lighting and braking indication.

11. A display for displaying a plurality of automobile functions, comprising:
    a plurality of compartments;
    a first plurality of miniature lamps mounted in a first of said plurality of compartments to define a first function display adapted to display a first automobile function;
    a first input means for causing lighting of said first plurality of miniature lamps upon occurrences of said first automobile function;
    a second plurality of miniature lamps mounted in a second of said plurality of compartments to define a dual function display adapted to display second and third automobile functions;
    a dual input means, comprising two inputs, for lighting said second plurality of miniature lamps upon either of said second and third automobile functions occurring independently of one another, one of said two inputs of said dual input means being provided with an attenuating means for attenuating the lighting of said second plurality of miniature lamps upon occurrence of said second automobile function; and
    wherein a third of said plurality of compartments has no miniature lamps mounted therein and includes a reflective screen, and said attenuating means is mounted in said third compartment behind said reflective screen.

12. A display as recited in claim 11, further comprising
    a third plurality of miniature lamps mounted in a fourth of said plurality of compartments to define a third function display adapted to display a fourth automobile function; and
    a third input means for causing lighting of said third plurality of miniature lamps upon occurrence of said fourth automobile function.

13. A display as recited in claim 12, further comprising a fourth plurality of miniature lamps mounted in a fifth of said plurality of compartments to define a fourth function display adapted to display a fifth automobile function; and
    a fourth input means for causing lighting of said fourth plurality of miniature lamps upon occurrence of said fifth automobile function.

14. A display as recited in claim 11, wherein
    said attenuating means comprises at least one resistor connected in series with said second plurality of miniature lamps of said dual function display.

15. A display as recited in claim 14, wherein said at least one resistor comprises two parallel resistors.

16. A display as recited in claim 11, wherein said attenuating means comprises an electronic voltage divider connected in series with said second plurality of miniature lamps of said dual function display.

17. A display as recited in claim 11, wherein said attenuating means comprises an electronic chopper connected in series with said second plurality of miniature lamps of said dual function display.

18. A display as recited in claim 11, wherein said first, second and third automobile functions are chosen from among directional indication, braking indication, automobile reversal indication, fog lamp lighting, and rear lighting.

19. A display as recited in claim 18, wherein said second and third automobile functions assigned to said dual function display are said rear lighting and said braking indication.

20. A display as recited in claim 11, wherein said second and third automobile functions assigned to said dual function display are rear lighting and braking indication.

* * * * *